(12) United States Patent
Ramachandran et al.

(10) Patent No.: US 8,845,286 B2
(45) Date of Patent: Sep. 30, 2014

(54) INTER-TURBINE DUCTS WITH GUIDE VANES

(75) Inventors: Dhinagaran Ramachandran, Karnaraka (IN); Sujatha Guntu, Andhra Pradesh (IN); Vinayender Kuchana, Andhra (IN); Balamurugan Srinivasan, Karnataka (IN); Anish Gupta, Karnatake (IN); Paul Couey, Tempe, AZ (US); Craig McKeever, Gilbert, AZ (US); Malak Malak, Tempe, AZ (US); Gopal Samy Muthiah, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 543 days.

(21) Appl. No.: 13/204,338

(22) Filed: Aug. 5, 2011

(65) Prior Publication Data
US 2013/0034433 A1  Feb. 7, 2013

(51) Int. Cl.
F01D 1/02 (2006.01)
F01D 9/04 (2006.01)

(52) U.S. Cl.
CPC ............... *F01D 9/042* (2013.01); *Y02T 50/671* (2013.01)
USPC ................... 415/199.5; 415/209.1; 415/211.2

(58) Field of Classification Search
USPC ............. 415/199.5, 191, 208.1, 208.2, 209.1, 415/211.2
See application file for complete search history.

(56) References Cited

U.S. PATENT DOCUMENTS

| | | |
|---|---|---|
| 5,531,400 A | 7/1996 | Demidov et al. |
| 5,845,482 A | 12/1998 | Carscalley |
| 6,488,470 B1 | 12/2002 | Owczarek |
| 6,851,264 B2 | 2/2005 | Kirtley et al. |
| 7,101,146 B2 | 9/2006 | Coull et al. |
| 7,137,245 B2 | 11/2006 | Graziosi et al. |
| 7,549,282 B2 | 6/2009 | Widenhoefer et al. |
| 7,610,179 B2 | 10/2009 | Florea et al. |
| 7,765,789 B2 | 8/2010 | Johnson |
| 7,854,586 B2 | 12/2010 | Major et al. |
| 8,061,980 B2 * | 11/2011 | Praisner et al. ............ 415/182.1 |
| 2005/0279100 A1 | 12/2005 | Graziosi et al. |

(Continued)

FOREIGN PATENT DOCUMENTS

| | | |
|---|---|---|
| EP | 1643083 A2 | 4/2006 |
| EP | 1914385 A2 | 4/2008 |
| EP | 1914385 A3 | 5/2009 |
| EP | 2159398 A2 | 3/2010 |

OTHER PUBLICATIONS

Gottlich, E.; Research on the aerodynamics of intermediate turbine diffusers; Progress in Aerospace Sciences 47 (2011) 249-279.
U.S. Appl. No. 13/462,738, filed May 2, 2012.

(Continued)

*Primary Examiner* — Edward Look
*Assistant Examiner* — William Grigos
(74) *Attorney, Agent, or Firm* — Ingrassia Fisher & Lorenz, P.C.

(57) ABSTRACT

A turbine section of a gas turbine engine is provided. The turbine section is annular about a longitudinal axis and includes first turbine with a first inlet and a first outlet; a second turbine with a second inlet and a second outlet; an inter-turbine duct extending from the first outlet to the second inlet and configured to direct an air flow from the first turbine to the second turbine; and a first guide vane disposed within the inter-turbine duct.

18 Claims, 5 Drawing Sheets

(56) References Cited

U.S. PATENT DOCUMENTS

| | | |
|---|---|---|
| 2006/0045732 A1 | 3/2006 | Durocher et al. |
| 2006/0185346 A1 | 8/2006 | Rolt |
| 2008/0056893 A1* | 3/2008 | Marini et al. ............... 415/191 |
| 2008/0056894 A1* | 3/2008 | Tsifourdaris et al. ......... 415/191 |
| 2009/0139202 A1 | 6/2009 | Agrawal et al. |
| 2010/0040462 A1* | 2/2010 | Praisner et al. ............ 415/208.1 |
| 2011/0079019 A1* | 4/2011 | Durocher et al. ............... 60/796 |

OTHER PUBLICATIONS

EP Communication, EP 13163242.4-1610 dated Mar. 9, 2013.
EP Search Report, EP 13163242.4-1610 dated Aug. 21, 2013.

\* cited by examiner

INTER-TURBINE DUCTS WITH GUIDE VANES

TECHNICAL FIELD

The present invention generally relates to gas turbine engines, and more particularly relates to inter-turbine ducts between the turbines of gas turbine engines.

BACKGROUND

A gas turbine engine may be used to power various types of vehicles and systems. A gas turbine engine may include, for example, five major sections: a fan section, a compressor section, a combustor section, a turbine section, and an exhaust nozzle section. The fan section induces air from the surrounding environment into the engine and accelerates a fraction of this air toward the compressor section. The remaining fraction of air induced into the fan section is accelerated through a bypass plenum and exhausted. The compressor section raises the pressure of the air it receives from the fan section and directs the compressed air into the combustor section where it is mixed with fuel and ignited. The high-energy combustion products then flow into and through the turbine section, thereby causing rotationally mounted turbine blades to rotate and generate energy. The air exiting the turbine section is exhausted from the engine through the exhaust section.

In some engines, the turbine section is implemented with one or more annular turbines, such as a high pressure turbine and a low pressure turbine. The high pressure turbine may be positioned upstream of the low pressure turbine and configured to drive a high pressure compressor, while the low pressure turbine is configured to drive a low pressure compressor and a fan. The high pressure and low pressure turbines have optimal operating speeds, and thus, optimal radial diameters that are different from one another. Because of this difference in radial size, an inter-turbine duct is arranged to fluidly couple the outlet of the high pressure turbine to inlet of the low pressure turbine and to transition between the changes in radius. It is advantageous from a weight and efficiency perspective to have a relatively short inter-turbine duct. However, decreasing the length of the inter-turbine duct increases the radial angle at which the air must flow between the turbines. Increasing the angle of the duct over a relatively short distance may result in boundary layer separation of the flow within the duct, which may adversely affect the performance of the low pressure turbine. Accordingly, the inter-turbine ducts are designed with a compromise between the overall size and issues with boundary separation. As a result, some conventional gas turbine engines may be designed with elongated inter-turbine ducts or inter-turbine ducts that do not achieve the optimal size ratio between the high pressure turbine and the low pressure turbine.

Accordingly, it is desirable to provide gas turbine engines with improved inter-turbine ducts. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a turbine section of a gas turbine engine is provided. The turbine section is annular about a longitudinal axis and includes first turbine with a first inlet and a first outlet; a second turbine with a second inlet and a second outlet; an inter-turbine duct extending from the first outlet to the second inlet and configured to direct an air flow from the first turbine to the second turbine; and a first guide vane disposed within the inter-turbine duct.

In accordance with one exemplary embodiment, an inter-turbine duct is provided extending between a first turbine having a first radial diameter and a second turbine having a second radial diameter, the first radial diameter being less than the second radial diameter. The inter-turbine duct includes a hub; a shroud circumscribing the hub to form a flow path fluidly coupled to the first turbine and the second turbine; and a first guide vane coupled to the shroud.

BRIEF DESCRIPTION OF THE DRAWINGS

The present invention will hereinafter be described in conjunction with the following drawing figures, wherein like numerals denote like elements, and FIG. 1 a schematic cross-sectional view of a gas turbine engine in accordance with an exemplary embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide gas turbine engines with improved inter-turbine ducts. In one exemplary embodiment, the inter-turbine duct is positioned between a high pressure turbine with a relatively small radial diameter and a low pressure turbine with a relatively large radial diameter. The inter-turbine duct may be defined by a shroud forming an outer boundary and a hub forming an inner boundary. The inter-turbine duct may further include one or more guide vanes to prevent or mitigate boundary separation of the air flow from the shroud as the air flow transitions in a radial direction. For example, a first guide vane may extend generally in a radial-circumferential plane as an axi-symmetric annular structure supported by struts extending from the shroud. A second guide vane may extend generally in an axial-radial direction from the outer shroud and only partially span the width of the inter-turbine duct. In some embodiments, the first guide vane may be supported by the second guide vane. Improvements in boundary separation enable shorter inter-turbine ducts, and as such, improvements in weight and efficiency.

Figure 1:
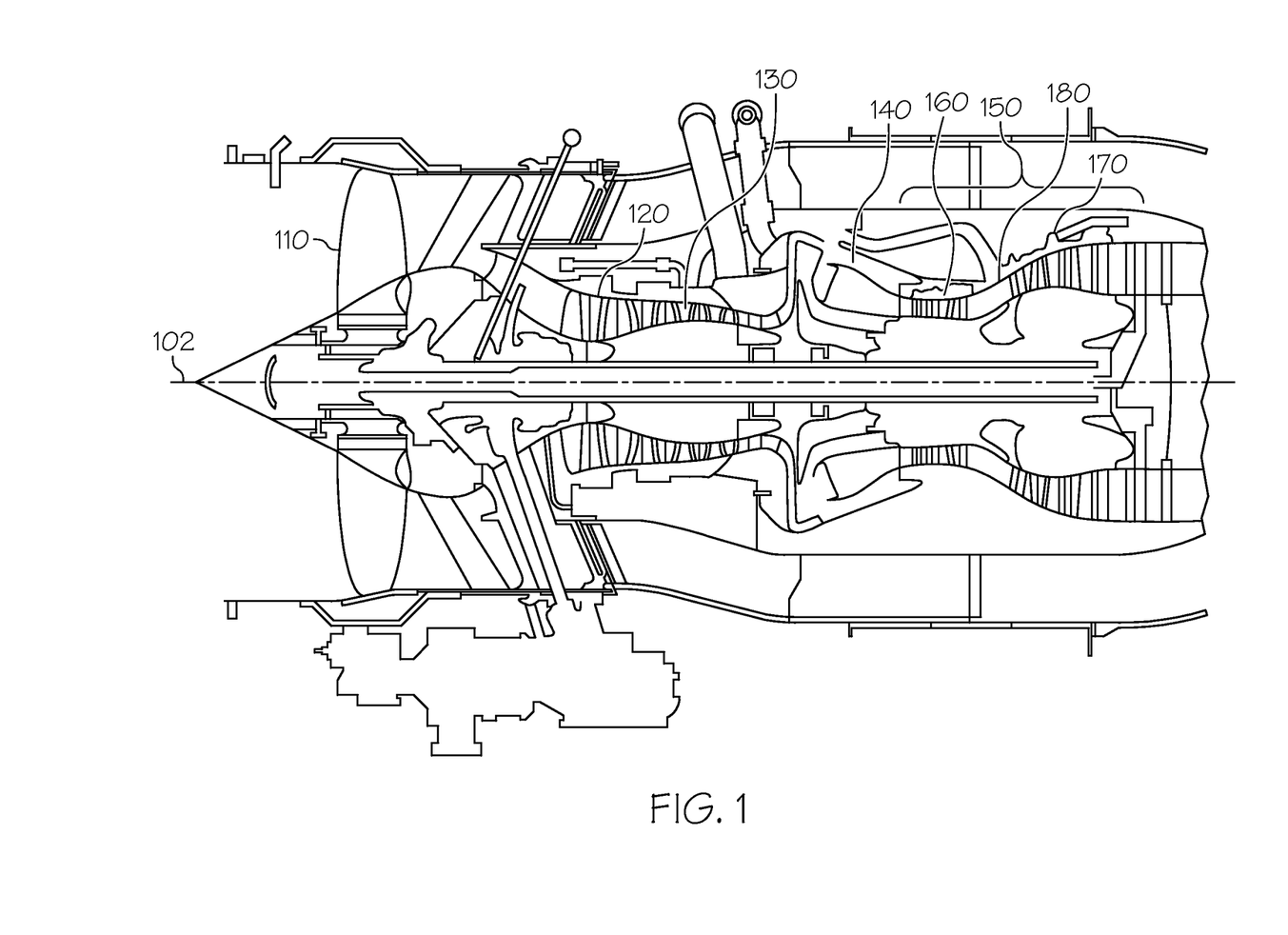

FIG. 1 a schematic cross-sectional view of a gas turbine engine 100 in accordance with an exemplary embodiment. As shown, the engine 100 may be an annular structure about a longitudinal or axial centerline axis 102. In the description that follows, the term "axial" refers broadly to a direction parallel to the axis 102 about which the rotating components of the engine 100 rotate. This axis 102 runs from the front of the engine 100 to the back of the engine 100. The term "radial" refers broadly to a direction that is perpendicular to the axis 102 and that points towards or away from the axis of the engine 100. A "circumferential" direction at a given point is a direction that is normal to the local radial direction and normal to the axial direction. As such, the term "axial-circumferential" plane generally refers to the plane formed by the axial and circumferential directions, and the term "axial-radial" plane generally refers to the plane formed by the axial and radial directions. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

The engine 100 generally includes, in serial flow communication, a fan section 110, a low pressure compressor 120, a high pressure compressor 130, a combustor 140, and a turbine section 150, which may include a high pressure turbine 160 and a low pressure turbine 170. During operation, ambient air enters the engine 100 at the fan section 110, which directs the air into the compressors 120 and 130. The compressors 120 and 130 provide compressed air to the combustor 140 in which the compressed air is mixed with fuel and ignited to generate hot combustion gases. The combustion gases pass through the high pressure turbine 160 and the low pressure turbine 170. As described in greater detail below, an inter-turbine duct 180 couples the high pressure turbine 160 to the low pressure turbine 170.

The high pressure turbine 160 and low pressure turbine 170 are used to provide thrust via the expulsion of the exhaust gases, to provide mechanical power by rotating a shaft connected to one of the turbines, or to provide a combination of thrust and mechanical power. As one example, the engine 100 is a multi-spool engine in which the high pressure turbine 160 drives the high pressure compressor 130 and the low pressure turbine 170 drives the low pressure compressor 120 and fan section 110.

Figure 2:
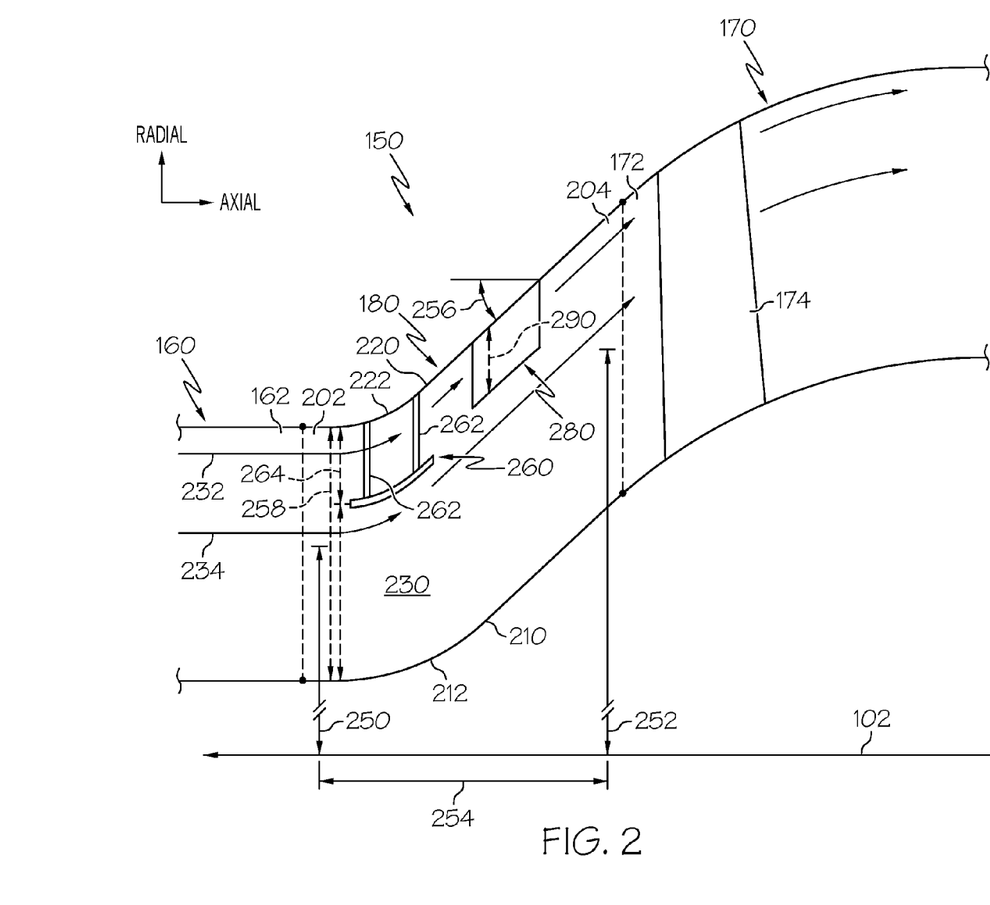
FIG. 2 is a schematic, partial cross-sectional view of a turbine section with an inter-turbine duct of the gas turbine engine of FIG. 1 in accordance with an exemplary embodiment.
Figure 3:
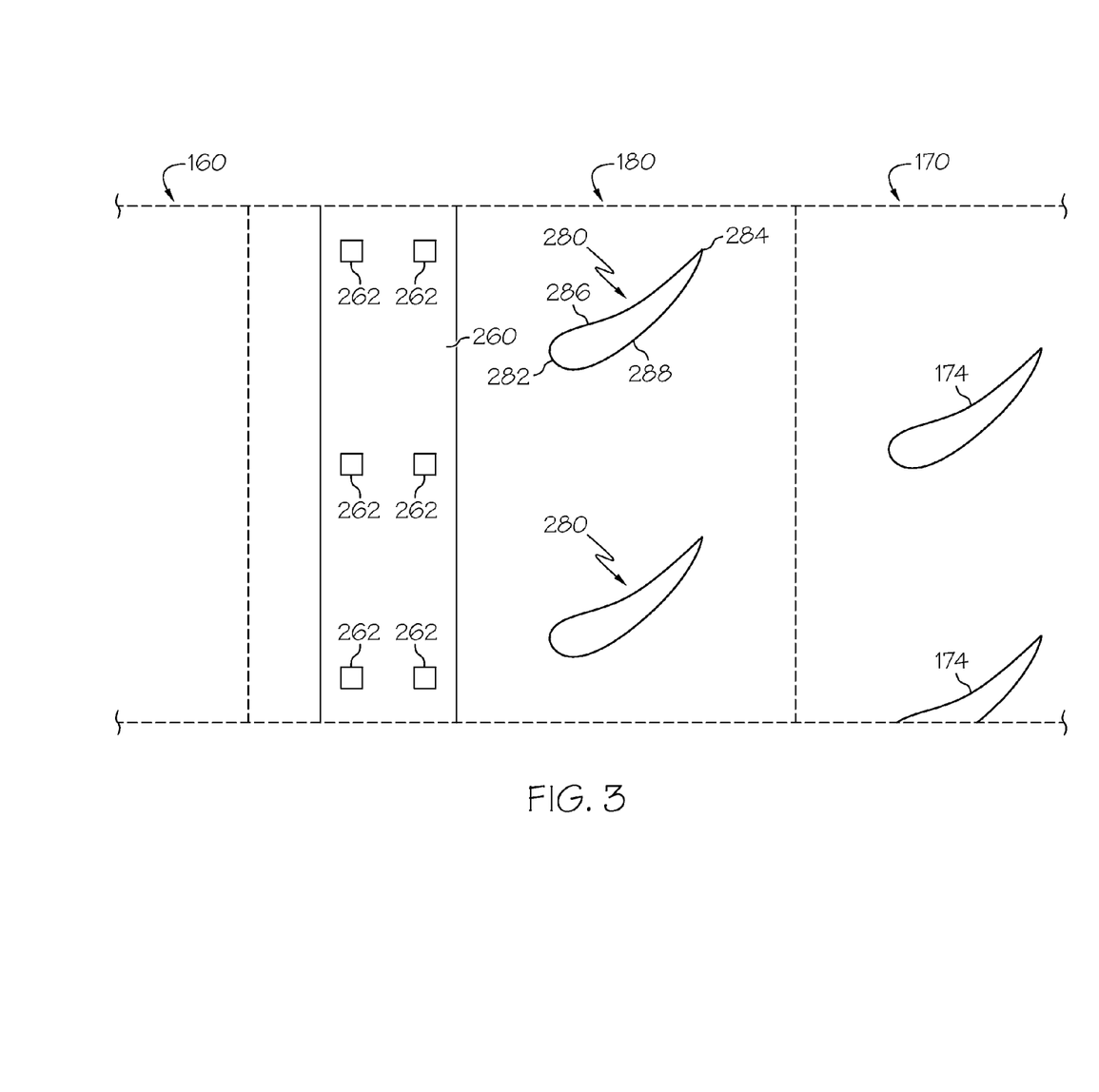
FIG. 3 is a schematic top view of the inter-turbine duct of FIG. 2 in accordance with an exemplary embodiment.

FIG. 2 is a schematic, partial cross-sectional view of a turbine assembly with an inter-turbine duct, such as the inter-turbine duct 180 of the turbine section 150 of the engine 100 of FIG. 1 in accordance with an exemplary embodiment. FIG. 3 is a schematic top view of the turbine section 150 of FIG. 2 in accordance with an exemplary embodiment. FIGS. 2 and 3 will be described together below.

As shown, the turbine section 150 includes the high pressure turbine 160, the low pressure turbine 170, and the inter-turbine duct 180 fluidly coupling the high pressure turbine 160 to the low pressure turbine 170. Particularly, the inter-turbine duct 180 includes an inlet 202 coupled to the outlet 162 of the high pressure turbine 160 and an outlet 204 coupled to the inlet 172 of the low pressure turbine 170. The annular structure of the inter-turbine duct 180 is defined by a hub 210 and a shroud 220 to create a flow path 230 for air flow (e.g., air flow 232 and 234) between the high pressure and low pressure turbines 160 and 170.

As noted above, the inter-turbine duct 180 transitions from a first radial diameter 250 at the inlet 202 (e.g., corresponding to the radial diameter at the outlet 162 of the high pressure turbine 160) to a larger, second radial diameter 252 (e.g., corresponding to the radial diameter at the inlet 172 of the low pressure turbine 170). In one exemplary embodiment, as shown in FIG. 2, the radial diameters are measured from the mid-point of the inter-turbine duct 180 although such diameters may also be measured from the hub 210 and/or the shroud 220. This transition is provided over an axial length 254. For example, the inlet 202 may be generally axial from the high pressure turbine 160, and at inflection points 212 and 222, the hub 210 and shroud 220 extend at an angle 256 to the outlet 204. FIG. 2 illustrates the angle 256 as being generally straight and constant, but other shapes may be provided, including constantly changing or stepped changes in radial diameter. In one exemplary embodiment, the angle 256 may be 30° or larger.

In general, it is advantageous to minimize the axial length 254 of the inter-turbine duct 180 for weight and efficiency. For example, a shorter axial length 254 may reduce the overall axial length of the engine 100 (FIG. 1) as well as reducing friction losses of the air flow 232 and 234. However, as the axial length 254 is decreased, the corresponding angle 256 of the inter-turbine duct 180 between the radial diameters 250 and 252 is increased.

During operation, the inter-turbine duct 180 functions to direct the air flow 232 and 234 along the radial transition between turbines 160 and 170. It is generally advantageous for the air flow 232 and 234 to flow smoothly through the inter-turbine duct 180. Particularly, it is advantageous if the air flow 232 adjacent to the shroud 220 maintains a path along the shroud 220 instead of undergoing a boundary layer separation. However, as the axial length 254 decreases and the angle 256 increases, the air flow 232 tends to maintain an axial momentum through the inlet 202 and, if not addressed, attempts to separate from the shroud 220, particularly near or downstream the inflection point 222. Such separations may result in vortices or other turbulence that result in undesirable pressure losses through the inter-turbine duct 180 as well as inefficiencies in the low pressure turbine 170.

In one exemplary embodiment, one or more guide vanes 260 and 280 are provided within the inter-turbine duct 180 to prevent or mitigate the air flow 232 from separating from the shroud 220. As described in greater detail below, two guide vanes 260 and 280 are illustrated in FIGS. 2 and 3 and may be used in combination or individually.

The first guide vane 260 may be referred to as a splitter and generally extends in an axial-circumferential plane, axi-symmetric about the axis 102. During operation, the first guide vane 260 prevents or mitigates flow separation by guiding the air flow 232 towards the shroud 220 or otherwise confining the flow 232 along the shroud 220. The first guide vane 260 may be supported on the shroud 220 by struts 262 that extend generally in the radial direction to secure the first guide vane 260. In general, the first guide vane 260 may be positioned in an area of the shroud 220 at which flow separation is an issue or just upstream of such areas. For example, the first guide vane 260 may be positioned at an upstream portion of the inter-turbine duct 180, such as at the inflection point 222 of the shroud 220, although other positions may be provided. In one exemplary embodiment, the first guide vane 260 may be annular and continuous about the axis 102, although in other embodiments, the first guide vane 260 may be in sections or panels.

The shape and size of the first guide vane 260 may be selected based on computational fluid dynamics (CFD) analysis of various flow rates through the inter-turbine duct 180 and/or weight, installation, cost or efficiency considerations. Although the first guide vane 260 generally extends in the axial-circumferential plane, the first guide vane 260 may also have a radial component. For example, in the embodiment shown in FIG. 2, the first guide vane 260 is generally parallel to the shroud 220, although other shapes and arrangements may be provided. The radial position 264 of the first guide vane 260 along the span or width 258 of the inter-turbine duct 180 may be determined by the length of the struts 262. Any radial position may be provided. In one exemplary embodiment, the radial position 264 of the first guide vane 260 is less than about 50% or about 20% of the span 258 of the inter-turbine duct 180. Similarly, the length of the first guide vane 260, either in the axial direction or the radial-axial direction, may be any suitable length based on the considerations discussed above.

The second guide vane 280 may be referred to as a partial vane and in the view of FIG. 2 generally extends in the radial-circumferential plane. A number of such guide vanes 280 may be provided about the circumference of the shroud 220, as is more clearly shown in FIG. 3. During operation, the second guide vane 280 prevents or mitigates flow separation by motivating the air flow 232 along the shroud 220. The second guide vane 280 may accelerate the air flow 232 in a circumferential direction, thereby reducing axial-radial flow separation. Like the first guide vane 260, the second guide vane 280 may be positioned in an area of the shroud 220 at which flow separation is an issue or just upstream of such an area. For example, the second guide vane 280 may be positioned just downstream of the first guide vane 260, although other positions may be provided.

The shape and size of the second guide vane 280 may be selected based on computational fluid dynamics (CFD) analysis of various flow rates through the inter-turbine duct 180 and/or weight, installation, cost or efficiency considerations. As best shown in FIG. 3, each second guide vane 280 may have shape similar to stator vanes of a turbine, e.g., stator vane 174 of the low pressure turbine 170. For example, each second guide vane 280 may have a generally concave pressure side 286 and a generally convex suction side 288 opposed thereto and joined at a leading edge 282 and a trailing edge 284. In the radial direction, the second guide vane 280 may extend to a length 290 that is a portion of the span 258 of the inter-turbine duct 180. For example, the second guide vane 280 may have a length 290 that is less than 50% or about 20% of the span 258 of the inter-turbine duct 180. In one exemplary embodiment, the exit angle of the second guide vane 280 is positioned to prevent or mitigate incidence with the inlet angle of the low pressure turbine 170.

In the embodiment of FIG. 2, the first guide vane 260 is upstream of the second guide vane 280, although in other embodiments, the axial positions may be reversed and/or one of the vanes 260 or 280 may be omitted. Accordingly, the first and second guide vanes 260 and 280 provide passive devices that maintain a smooth flow through the inter-turbine duct 180, particularly along the shroud 220. In general, active devices, such as flow injectors, are not necessary.

Figure 4:
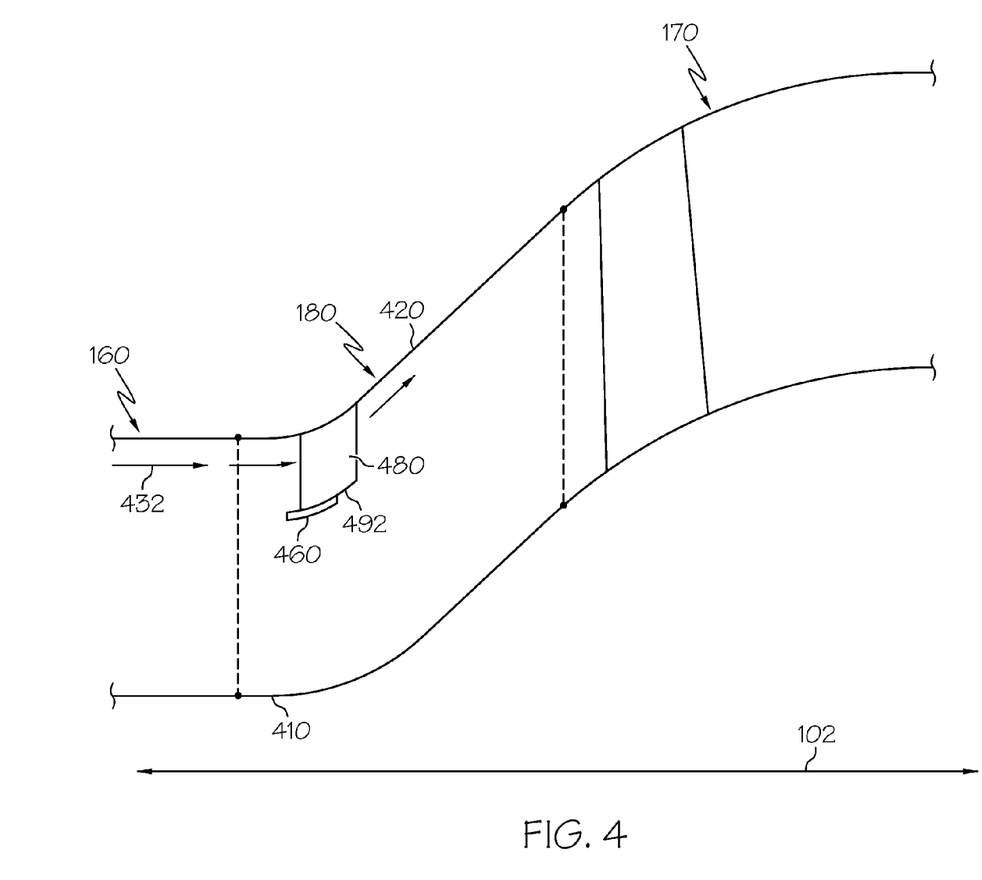
FIG. 4 is a schematic, partial cross-sectional view of a turbine section of an inter-turbine duct of the gas turbine engine of FIG. 1 in accordance with an alternate exemplary embodiment.
Figure 5:
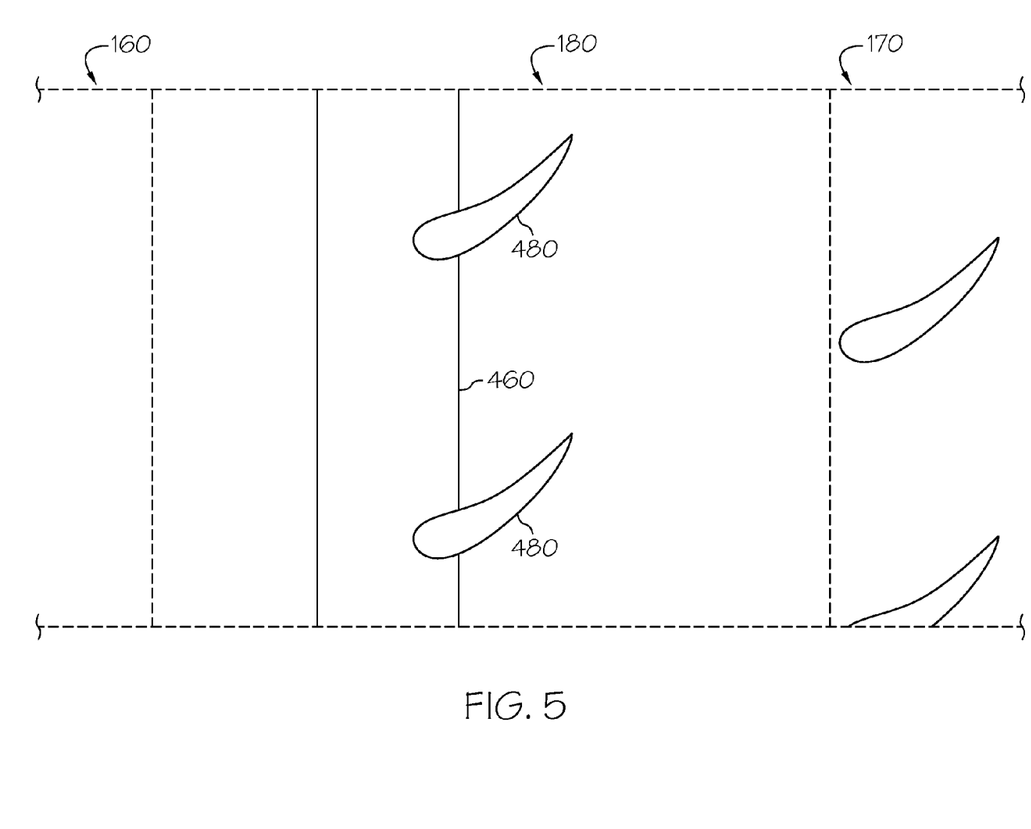
FIG. 5 is a schematic top view of the inter-turbine duct of FIG. 4 in accordance with an exemplary embodiment.

FIG. 4 is a schematic, partial cross-sectional view of the inter-turbine duct 180 of the engine 100 of FIG. 1 in accordance with an alternate exemplary embodiment, and FIG. 5 is a schematic top view of the inter-turbine duct 180 of FIG. 4 in accordance with an exemplary embodiment. The inter-turbine duct 180 of FIGS. 4 and 5 is generally similar to the inter-turbine duct 180 described above in reference to FIGS. 2 and 3 with a shroud 420 and hub 410 extending between the high pressure turbine 160 and the low-pressure turbine 170. As above, the inter-turbine duct 180 includes a first guide vane 460 that generally extends in an axial-circumferential plane, axi-symmetrical about the axis 102, and a second guide vane 480 that generally extends in the radial-circumferential plane to individually and/or collectively prevent or mitigate air flow 432 from separating from the shroud 420.

In the embodiment of FIGS. 4 and 5, the second guide vane 480 supports the first guide vane 460. In particular, the first guide vane 460 is positioned on the radial tip 492 of the second guide vane 480, as shown, or along the radial length of the second guide vane 480. As such, by comparison, the struts 232 of FIGS. 2 and 3 may be omitted in this embodiment.

Accordingly, inter-turbine ducts are provided with guide vanes that prevent or mitigate boundary separation. By maintaining the energy of the boundary layer flowing through the duct, a more aggressively diverging duct can be used, allowing for the design of more compact, and also more efficient, turbines for engines. In particular, the radial angle of the inter-turbine duct may be increased and the axial length may be decreased to reduce the overall length and weight of the engine and to reduce friction and pressure losses in the turbine section. In one exemplary embodiment, the guide vanes may reduce pressure losses by more than 15%. Additionally, the guide vanes enable the use of a desired ratio between the radial sizes of the high pressure turbine and the low pressure turbine.

The relatively compact nature of the flow control scheme of the guide vanes also enables retrofitting of existing engines and engine designs with a minimum of additional complexity. In general, the techniques described above can be applied either during the design of a new engine to take advantage of the shorter duct length and optimized area-ratio made possible by the boundary layer control, or to retrofit an existing engine or engine design in order to improve the efficiency of the engine while changing the design as little as possible. Although reference is made to the exemplary gas turbine engine depicted in FIG. 1, it is contemplated that the inter-turbine ducts discussed herein may be adapted for use with other types of turbine engines including, but not limited to steam turbines, turboshaft turbines, water turbines, and the like. Moreover, the turbine engine described above is a turbofan engine for an aircraft, although exemplary embodiments may include without limitation, power plants for ground vehicles such as locomotives or tanks, power-generation systems, or auxiliary power units on aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine section of a gas turbine engine, the turbine section being annular about a longitudinal axis, the turbine section comprising:
    a first turbine with a first inlet and a first outlet;
    a second turbine with a second inlet and a second outlet;
    an inter-turbine duct extending from the first outlet to the second inlet and configured to direct an air flow from the first turbine to the second turbine; and
    a first guide vane disposed within the inter-turbine duct,
    wherein the inter-turbine duct is defined by a shroud extending between the first outlet and the second inlet and a hub extending between the first outlet and the second inlet, wherein the shroud and the hub are separated in a radial direction at a first distance, the first guide vane being spaced from the shroud in the radial direction at less than 50% of the first distance.

2. The turbine section of claim 1, wherein the first guide vane is a splitter extending in a circumferential direction about the longitudinal axis.

3. The turbine section of claim 2, wherein the first guide vane generally extends in an axial-circumferential plane.

4. The turbine section of claim 2, wherein the first guide vane is spaced from the shroud in the radial direction at about 20% of the first distance.

5. The turbine section of claim 2, wherein first guide vane is generally parallel to the shroud.

6. The turbine section of claim 2, wherein the first guide vane is configured to prevent separation of air flow from the shroud.

7. The turbine section of claim 1, wherein the first guide vane is a passive flow control device.

8. The turbine section of claim 1, wherein the first turbine is a high pressure turbine and the second turbine is a low pressure turbine.

9. The turbine section of claim 2, further comprising struts extending from the shroud to support the first guide vane.

10. The turbine section of claim 1, further comprising a second guide vane that generally extends in an axial-radial plane.

11. The turbine section of claim 10, wherein the second guide vane extends from the shroud.

12. The turbine section of claim 11, wherein the second guide vane extends from the shroud at a height that is less than about 50% of the first distance.

13. The turbine section of claim 1, wherein the first guide vane is positioned in an upstream section of the inter-turbine duct.

14. An inter-turbine duct extending between a first turbine having a first radial diameter and a second turbine having a second radial diameter, the first radial diameter being less than the second radial diameter, the inter-turbine duct comprising:
    a hub;
    a shroud circumscribing the hub to form a flow path fluidly coupled to the first turbine and the second turbine; and
    a first guide vane coupled to the shroud and generally extending in an axial-radial plane from the shroud at a height that is less than about 50% of a radial distance between the hub and shroud.

15. The inter-turbine duct of claim 14, further comprising a second guide vane and struts coupling the second guide vane to the shroud such that the second guide vane generally extends in an axial-circumferential plane and is spaced from the shroud in the radial direction at less than 50% of the radial distance between the hub and shroud.

16. The inter-turbine duct of claim 14, wherein the second guide vane generally extends in an axial-circumferential plane and is spaced from the shroud in the radial direction at less than 50% of the radial distance between the hub and shroud.

17. The inter-turbine duct of claim 16, wherein the first guide vane couples the second guide vane to the shroud.

18. A turbine section of a gas turbine engine, the turbine section being annular about a longitudinal axis, the turbine section comprising:
    a high pressure turbine with a first inlet and a first outlet;
    a low pressure turbine with a second inlet and a second outlet;
    an inter-turbine duct extending from the first outlet to the second inlet and configured to direct an air flow from the high pressure turbine to the low pressure turbine, the inter-turbine duct comprising
    a hub, and
    a shroud circumscribing the hub at a first distance;
    a first guide vane coupled to the shroud and generally extending in an axial-circumferential plane at a radial direction less than 50% of the first distance, and
    a second guide vane coupled to the shroud and generally extending in an axial-radial plane at a height that is less than about 50% of the first distance.

* * * * *